United States Patent [19]
Cann et al.

[11] Patent Number: 6,004,677
[45] Date of Patent: *Dec. 21, 1999

[54] GAS PHASE PRODUCTION OF POLYDIENES WITH PRE-ACTIVATED NICKEL CATALYSTS

[75] Inventors: Kevin Joseph Cann, Rocky Hill; Maria Angelica Apecetche, Piscataway; Minghui Zhang, Bridgewater, all of N.J.

[73] Assignee: Union Carbide Chemicals & Plastics Technology Corporation, Danbury, Conn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/907,765

[22] Filed: Aug. 8, 1997

[51] Int. Cl.[6] .............................. B32B 25/16; C08F 4/70; C08F 136/08

[52] U.S. Cl. ..................... 428/407; 428/402; 524/571; 524/573; 524/577; 524/855; 524/856; 526/133; 526/137; 526/138; 526/140; 526/141; 526/142; 526/169.1; 526/335; 526/340; 526/901

[58] Field of Search .................... 526/133, 142, 526/169.1, 901, 335, 340, 138, 137; 523/207; 524/856, 571, 573, 575, 577, 855; 428/402, 407

[56] References Cited

U.S. PATENT DOCUMENTS

| | | | |
|---|---|---|---|
| 4,102,817 | 7/1978 | Throckmorton et al. | 252/429 B |
| 4,994,534 | 2/1991 | Rhee et al. | 526/88 |
| 5,412,045 | 5/1995 | Osman et al. | 526/133 |
| 5,453,471 | 9/1995 | Bernier et al. | 526/68 |
| 5,652,304 | 7/1997 | Calderon et al. | 526/162 |

FOREIGN PATENT DOCUMENTS

WO 9604322  2/1996  WIPO.

*Primary Examiner*—Fred Teskin
*Attorney, Agent, or Firm*—B. L. Deppenbrock

[57] ABSTRACT

There is provided a process for producing polydienes, such as polybutadiene and polyisoprene, in a gas phase fluidized bed reactor using a pre-activated nickel catalyst which is highly active for cost effective production of these dienes in gas phase.

17 Claims, No Drawings

GAS PHASE PRODUCTION OF POLYDIENES WITH PRE-ACTIVATED NICKEL CATALYSTS

FIELD OF THE INVENTION

This invention relates to a polymerization process for producing polydienes in gas phase. More particularly, the invention relates to a process for producing polydienes, such as polybutadiene and polyisoprene, in a gas phase reactor using a pre-activated nickel catalyst which is highly active for production of these dienes.

BACKGROUND OF THE INVENTION

Nickel and rare earth metal containing catalysts have been widely used commercially to make polybutadiene (BR) in solution and slurry polymerizations. Commercial facilities employ solution and slurry processes which are energy intensive. These processes produce polymer in a bale-like form which must be subsequently pulverized or ground.

More recently, it has been discovered that polydienes such as polybutadiene and polyisoprene can be produced in gas phase, e.g., fluidized bed, reactors. Such processes are described, for example, in U.S. Pat. Nos. 4,994,534 and 5,453,471; and in WO 96/04322 and 96/04323. These processes operate at lower cost as compared to solution and slurry processes and produce a polymer which is granular and flowable upon leaving the gas phase reactor. The polymer does not require subsequent pulverization steps. The gas phase production is also more environmentally acceptable due to the absence of a solvent removal step.

Compared to rare earth metal catalysts, such as neodymium metal containing catalysts, nickel catalysts are inexpensive and readily available. However, nickel catalysts which are sometimes employed to produce polybutadiene and polyisoprene in solution and slurry processes have not been sufficiently active for the production of these polymers in gas phase, fluidized reactions. They can have long induction periods and short life spans for producing polymer, and can produce a product such as polybutadiene having less desirable levels of 1,4-cis butadiene units (i.e., less than 90%).

Accordingly, there is a need to increase the productivity of these nickel catalysts such that they can be used cost-effectively in gas phase reactions.

SUMMARY OF THE INVENTION

Surprisingly, the present invention provides a highly active and productive catalyst for gas phase polymerization. Accordingly, there is provided a process for the polymerization of a diene and/or a vinyl substituted aromatic compound selected from the group of monomers consisting of butadiene, isoprene, styrene, and mixtures thereof comprising: polymerizing at least one of the monomers in a gas phase reactor with a pre-activated catalyst under polymerization conditions in the presence of an inert gas; wherein the pre-activated catalyst system comprises a reaction mixture of (i) an organonickel compound;
(ii) an organoaluminum; and
(iii) at least one $BF_3$ or HF complex, wherein components (i), (ii) and (iii) are mixed together while in the presence of a small amount of at least one (iv) conjugated diolefin. The conjugated diolefin (iv) can be the same or different from the monomer(s) being polymerized, but preferably is the same as at least one of them. Optionally, water (v) can be included in the above-described pre-activated catalyst system or added during the polymerization process. Preferably the polymerization is conducted in the presence of an inert particulate material.

There is also provided a novel granular, particulate, free-flowing resin particle produced in accordance with the inventive process.

DETAILED DESCRIPTION OF THE INVENTION

Polymers Produced

The polymers produced by the present invention can include polybutadiene, polyisoprene, polystyrene, butadiene-isoprene copolymers, butadiene-styrene copolymers, and isoprene-styrene copolymers. The polymer molecular weights, particularly those of polybutadiene, can vary from a weighted average of molecular weight of 200,000 to 2,000,000. The dispersity index can vary between 2 and 20.

The polymers produced by the process of the invention have a novel, granular, particulate, free-flowing resin particle comprising (i) an outer shell having a mixture of an inert particulate material and a polymer and said inert particulate material being present in the outer shell in an amount higher than 75% by weight based on the weight of the outer shell, and (ii) an inner core having a mixture of polymer and inert particulate material, said polymer being present in the inner core in an amount higher than 90% by weight based on the weight of said inner core, wherein said polymer is a homopolymer or copolymer of a conjugated diene, a vinyl-substituted compound, or a mixture thereof; and which resin particle has a residue of nickel in an amount ranging from about 1 ppm to 240 ppm, preferably from about 2 ppm to 60 ppm; a residue of fluorine ranging in amount from 0.6 ppm to 20,000 ppm, preferably 5 ppm to 1,200 ppm based upon total polymer weight. When $BF_3$ is employed as the promoter, the resin has a residue of fluorine ranging in amount from 1 ppm to 47,000 ppm, preferably 6 ppm to 2,200 ppm based upon total polymer weight. Additionally, the resin has a boron residue ranging from about 0.2 ppm to about 9,000 ppm, preferably about 1 ppm to 420 ppm based upon the total polymer weight. These polymers have a reduced viscosity ranging from about 1 to 15 deciliter/gram (dl/g), preferably from about 2.5 to 4.5 dl/g. Further, the 1,4-cis content of the polymer (e.g., polybutadiene) is greater than 90% cis, preferably greater than 96% in 1,4-cis content.

Monomers Employed

Monomers employed in the process of the present invention include butadiene (e.g., 1,3- butadiene), isoprene, styrene, and mixtures thereof.

Polymerization Processes and Conditions

The present invention is not limited to any specific type of stirred or fluidized gas phase polymerization reaction and can be carried out in a single reactor or multiple reactors (two or more reactors preferably connected in series). In addition to well-known conventional gas phase polymerizations processes, "condensed mode", including the so-called "induced condensed mode", and "liquid monomer" operation of a gas phase polymerization reactor can be employed.

A conventional fluidized bed process for producing resins is practiced by passing a gaseous stream containing one or more monomers, usually one monomer, continuously through a fluidized bed reactor under reactive conditions in the presence of a nickel catalyst. Product is withdrawn from the reactor. A gaseous stream of unreacted monomer is withdrawn from the reactor continuously and recycled into the reactor along with make-up monomer added to the recycle stream. Conventional gas phase polymerizations are disclosed, for example, in U.S. Pat. Nos. 3,922,322; 4,035,560; and 4,994,534. Optionally, and preferably, a conventional polymerization of the present invention is conducted in the presence of one or more inert particulate materials as described in U.S. Pat. No. 4,994,534.

Condensed mode polymerizations are disclosed in U.S. Pat. Nos. 4,543,399; 4,588,790; 4,994,534; 5,352,749; and 5,462,999. Condensing mode processes are employed to achieve higher cooling capacities and, hence, higher reactor productivity. In these polymerizations a recycle stream, or a portion thereof, can be cooled to a temperature below the dew point in a fluidized bed polymerization process, resulting in condensing all or a portion of the recycle stream. The recycle stream is returned to the reactor. The dew point of the recycle stream can be increased by increasing the operating pressure of the reaction/recycle system and/or increasing the percentage of condensable fluids and decreasing the percentage of non-condensable gases in the recycle stream. The condensable fluid may be inert to the catalyst, reactants and the polymer product produced; it may also include monomers and comonomers. The condensing fluid can be introduced into the reaction/recycle system at any point in the system. Condensable fluids include saturated or unsaturated hydrocarbons. In addition to condensable fluids of the polymerization process itself, other condensable fluids, inert to the polymerization can be introduced to "induce" condensing mode operation. Examples of suitable condensable fluids may be selected from liquid saturated hydrocarbons containing 2 to 8 carbon atoms (e.g., ethane, propane, n-butane, isobutane, n-pentane, isopentane, neopentane, n-hexane, isohexane, and other saturated $C_6$ hydrocarbons, n-heptane, n-octane and other saturated $C_7$ and $C_8$ hydrocarbons, and mixtures thereof). Condensable fluids may also include polymerizable condensable comonomers such as olefins, alpha-olefins, diolefins, diolefins containing at least one alpha olefin, and mixtures thereof. In condensing mode, it is desirable that the liquid entering the fluidized bed is dispersed and vaporized quickly.

Liquid monomer polymerization mode is disclosed in U.S. Pat. No. 5,453,471; U.S. Ser. No. 510,375; PCT 95/09826 (US) and PCT 95/09827 (US). When operating in the liquid monomer mode, liquid can be present throughout the entire polymer bed provided that the liquid monomer present in the bed is adsorbed on or absorbed in solid particulate matter present in the bed, such as in/on polymer being produced or fluidization aids, also known as inert particulate materials (e.g., carbon black, silica, clay, talc, and mixtures thereof) present in the bed, so long as there is no substantial amount of free liquid monomer present. Liquid mode makes it possible to produce polymers in a gas phase reactor using monomers having condensation temperatures much higher than the temperatures at which conventional polyolefins are produced.

In general, a liquid monomer process is conducted in a stirred bed or gas fluidized bed reaction vessel having a polymerization zone containing a bed of growing polymer particles. The process comprises continuously introducing a stream of one or more monomers and optionally one or more inert gases into the polymerization zone optionally in the presence of one or more inert particulate materials; continuously or intermittently introducing a pre-activated nickel polymerization catalyst as described herein into the polymerization zone; continuously or intermittently withdrawing polymer product from the polymerization zone; and continuously withdrawing unreacted gases from the zone; compressing and cooling the gases while maintaining the temperature within the zone below the dew point of at least one monomer present in the zone. If there is only one monomer present in the gas-liquid stream, there is also present at least one inert gas. Typically, the temperature within the zone and the velocity of gases passing through the zone are such that essentially no liquid is present in the polymerization zone that is not adsorbed on or absorbed in solid particulate matter. The use of fluidization aids is preferred in the liquid monomer process and in the process of the present invention. In view of the dew points or condensation temperatures of the dienes employed in the gas phase polymerization process of the present invention, liquid monomer mode is the preferred polymerization mode for polydienes.

In general, the elastomers are produced in a gas-phase fluidized reactor at or above the softening or sticking temperature of the polymer product optionally and preferably in the presence of an inert particulate material selected from the group consisting of carbon black, silica, clay, talc, and mixtures thereof Of the inert particulate materials, carbon black, silica, and a mixture thereof are preferred, with carbon black being most preferred. The inert particulate material is employed in the gas-phase polymerization in an amount ranging from about 0.3 to about 80 weight percent, preferably about 5 to about 75 weight percent, most preferably 5 to 50 weight percent based on the weight of the final elastomeric polymer product.

Generally, all of the above modes of polymerizing are carried out in a gas phase fluidized bed made up of or containing a "seed bed" of polymer which is the same or different from the polymer product being produced. The bed is preferably made up of the same granular resin that is to be produced in the reactor. Thus, during the course of the polymerization, the bed comprises formed polymer particles, growing polymer particles, and catalyst particles fluidized by polymerizing and modifying gaseous components introduced at a flow rate or velocity sufficient to cause the particles to separate and act as a fluid.

The fluidizing gas is made up of the initial feed, make-up feed, and cycle (recycle) gas, i.e., monomers, and, if desired, modifiers and/or an inert carrier gas (e.g., nitrogen, argon, or inert hydrocarbon (e.g., a $C_1-C_{20}$ alkane such as ethane or butane), with nitrogen and/or butane being preferred). A typical cycle gas is comprised of one or more monomers, inert carrier gas(es), and optionally hydrogen, either alone or in combination. The process can be carried out in a batch or continuous manner, the latter being preferred. The essential parts of the reactor are the vessel, the bed, the gas distribution plate, inlet and outlet piping, at least one compressor, at least one cycle gas cooler or heat exchanger, and a product discharge system. In the vessel, above the bed, there is a velocity reduction zone, and in the bed, a reaction zone. Both are above the gas distribution plate.

Variations in the reactor can be introduced if desired. One involves the relocation of one or more cycle gas compressors from upstream to downstream of the cooler and another involves the addition of a vent line from the top of the product discharge vessel (stirred tank product) back to the top of the reactor to improve the fill level of the product discharge vessel.

Polymerization can also be conducted by charging one monomer initially, allowing it to polymerize, and then adding a second monomer, and allowing it to polymerize in a single polymerization vessel. Alternatively, two or more polymerization vessels, preferably connected in series, can be used to polymerize with two or more monomers. Using multiple reactors, one monomer can be polymerized in the first reactor, and additional monomers can be polymerized in second or subsequent reactors.

In general the polymerization conditions in the gas phase reactor are such that the temperature ranges from about 0° to 120° C., preferably about 40° to 100° C., and most preferably about 50° to 80° C. Partial pressure will vary depending upon the particular monomer employed and the temperature of the polymerization, and it can range from about 1 to 125 psi. Condensation temperatures of the monomers are well known. In general, it is preferred to operate at a partial pressure slightly above to slightly below (that is, ±10 psi) the dew point of the monomer. For example, for butadiene and isoprene-butadiene, the partial pressure ranges from about 10 to about 100 psi; and isoprene partial pressure ranges from about 10 to about 50 psi. For an isoprene polymerization in liquid monomer mode the liquid monomer (isoprene) is maintained at a concentration of about 1 to about 30 wt/% of isoprene monomer to polymer in the reactor. Total reactor pressure ranges from about 100 to about 500 psi. Though not a diene, styrene is polymerized analogous to other diene polymerizations such as those of butadiene or ethylidene norbornene. Typically, the process of this invention is operated to have a space-time-yield ratio (STY) of about 1:10. That is, they generally require a longer residence time than alpha olefin polymerizations. The higher the space-time-yield ratio the faster the polymer product is produced in the reactor.

Pre-activated Nickel Catalysts

In the present invention the pre-activated catalyst comprises reaction mixture of (i) an organonickel compound, (ii) an organoaluminum; and (iii) at least one $BF_3$ complex or HF complex, wherein components (i), (ii) and (iii) are mixed together while in the presence of a small amount of at least one conjugated diolefin (iv). Optionally, water can added to the pre-activated catalyst reaction mixture (components (i) through (iii) or components (i) through (iv))or it can be added during the polymerization process in the reactor.

The catalyst employed in the polymerization contains a nickel compound. Nickel compounds of the catalyst are organonickel compounds of nickel with mono- or bi- dentate organic ligands containing up to 20 carbon atoms. "Ligand" is defined as an ion or molecule bound to and considered bonded to a metal atom or ion. Mono-dentate means having one position through which covalent or coordinate bonds with the metal may be formed; bi-dentate means having two positions through which covalent or coordinate bonds with the metal may be formed. The organonickel compounds are generally soluble in inert solvents. Thus, any salt of an organic acid containing from about 1 to 20 carbon atoms may be employed. Representative of organonickel compounds are nickel benzoate, nickel acetate, nickel naphthenate, nickel octanoate, nickel neodecanoate, nickel 2-ethylhexanoate, bis(π-allyl nickel), bis(π-cycloocta-1,5-diene), bis(π-allyl nickel trifluoroacetate), bis(α-furyl dioxime) nickel, nickel palmitate, nickel stearate, nickel acetylacetonate, nickel salicaldehyde, bis(salicyladehyde) ethylene diimine nickel, bis(cyclopentadiene) nickel, cyclopentadienylnickel, nitrosyl and nickel tetracarbonyl. The preferred nickel is a nickel salt of a carboxylic acid or an organic complex compound of nickel.

Co-catalysts that can be employed with the component containing nickel are organoaluminum compounds. Any organoaluminum having the formula:

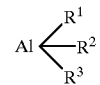

wherein $R^1$ is selected from the group consisting of alkyl, cycloalkyl, aryl, alkaryl, arylalkyl, alkoxy, hydrogen and fluorine; $R^2$ and $R^3$ are the same or different and are selected from the group consisting of alkyl, cycloalkyl, aryl, alkaryl, and arylalkyl. The ratio of Al/Ni may be varied between about 1:1 to 500:1, preferably between about 2:1 to 100:1, and most preferably about 5:1 to 25:1.

Representative of compounds corresponding to the formula are diethyl aluminum fluoride, di-n-propyl aluminum fluoride, di-n-butyl aluminum fluoride, diisobutyl aluminum fluoride, dihexyl aluminum fluoride, dioctyl aluminum fluoride, and diphenyl aluminum fluoride. Also included are diethyl aluminum hydride, di-n-propyl aluminum hydride, di-n-butyl aluminum hydride, diisobutyl aluminum hydride, diphenyl aluminum hydride, di-p-tolyl aluminum hydride, dibenzyl aluminum hydride, phenyl ethyl aluminum hydride, phenyl-n-propyl aluminum hydride, p-tolyl ethyl aluminum hydride, p-tolyl n-propyl aluminum hydride, p-tolyl isopropyl aluminum, benzyl ethyl aluminum hydride, benzyl n-propyl aluminum hydride, and benzyl isopropyl aluminum hydride and other organoaluminum hydrides. Also included are trimethyl aluminum, triethyl aluminum, tri-n-propyl aluminum, triisopropyl aluminum, tri-n-butyl aluminum, triisobutyl aluminum, tripentyl aluminum, trihexyl aluminum, tricyclohexyl aluminum, trioctyl aluminum, triphenyl aluminum, tri-p-tolyl aluminum, tribenzyl aluminum, ethyl diphenyl aluminum, ethyl di-p-tolyl aluminum, ethyl dibenzyl aluminum, diethyl phenyl aluminum, diethyl—tolyl aluminum, diethyl benzyl aluminum and other triorganoaluminum compounds. Also included are diethylaluminum ethoxide, diisobutylaluminum ethoxide and dipropylaluminum methoxide. Mixtures of these organoaluminum compounds can also be employed in the invention. Of these organoaluminum compounds triethylaluminum (TEAL), triisobutylaluminum (TIBA), diethyl aluminum chloride (DEAC), partially hydrolyzed DEAC, methylaluminoxane (MAO), modified methylaluminoxane (MMAO), and mixtures of them are preferred.

When MAO or MMAO is employed as the co-catalyst, it may be activated by one of the following: (a) branched or cyclic oligomeric poly(hydrocarbylaluminum oxide)s which contain repeating units of the general formula —(Al(R''')—, where R''' is hydrogen, an alkyl radical containing from 1 to about 12 carbon atoms, or an aryl radical such as a substituted or unsubstituted phenyl or naphthyl group; (b) ionic salts of the general formula $[A+][BR^*_4{}^-]$, where $A^+$ is a cationic Lewis or Bronsted acid capable of abstracting an alkyl, halogen, or hydrogen from the transition metal component of the catalyst, B is boron, and $R^*$ is a substituted aromatic hydrocarbon, preferably a perfluorophenyl radical; and (c) boron alkyls of the general formula $BR^*_3$, where $R^*$ is as defined above.

Aluminoxanes are well known in the art and comprise oligomeric linear alkyl aluminoxanes represented by the formula:

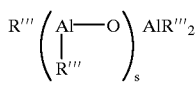

and oligomeric cyclic alkyl aluminoxanes of the formula:

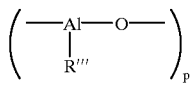

wherein s is 1 to 40, preferably 10 to 20; p is 3 to 40, preferably 3 to 20; and R''' is an alkyl group containing 1 to 12 carbon atoms, preferably methyl or an aryl radical such as a substituted or unsubstituted phenyl or naphthyl radical. Modified methylaluminoxane is formed by substituting 20–80 wt % of the methyl groups with a $C_2$ to $C_{12}$ group, preferably with isobutyl groups, using techniques known to those skilled in the art.

Promoters that can be used with the component containing nickel include hydrogen fluoride (HF) and borontrifluoride ($BF_3$), either in their pure state or as a complex. The ratio of HF:Al or $BF_3$:Al may be varied between about 0.5:1 to 3.5:1. For HF or its complexes, the HF:Al ratio may be varied between about 0.5:1 to 3.5:1, preferably about 1:1 to 2.5:1, and most preferably 1.5:1 to 2.5:1. For $BF_3$ and its complexes, the $BF_3$:Al ratio may be varied between about 0.5:1 to 3:1, preferably about 0.5:1 to 2:1, and most preferably about 0.6:1 to 1.5:1. Representative of these complexes are well known and are disclosed, for example, in U.S. Pat. Nos. 4,102,817 and 5,412,045. They are complexes formed between HF or $BF_3$ and molecule(s) from the following class of organic compounds: ether, alcohol, ketone, nitrile, carboxylic acid, ester, amine, and sulfide.

An ether is a substance that has two organic residues bonded to the same oxygen atom, R—O—R', where R and R' represent alkyl, cycloalkyl, aryl, alkaryl, and arylalkyl containing 1 to about 30 carbon atoms; where R and R' may be the same or different. R and R' may also be joined together through a common carbon bond to form a cyclic ether with the ether oxygen being a part of the cyclic structure such as tetrahydrofuran, furan, and dioxane. Representative but not exhaustive of ethers that may be used in the HF or $BF_3$ complexes in this invention are dimethyl ether, diethyl ether, dibutyl ether, diamyl ether, diisopropyl ether, diphenyl ether, dibenzyl ether, ethyl methyl ether, tetrahydrofuran, anisole, and the like.

An alcohol is a substance that has a carbon atom attached by a single bond to oxygen which is in turn attached to a hydrogen by a single bond, R—O—H, where R represents alkyl, cycloalkyl, aryl, alkaryl, and arylalkyl containing 1 to about 30 carbon atoms. Representative but not exhaustive of alcohols that may be used in the HF or $BF_3$ complexes in this invention are methanol, ethanol, n-propanol, isopropanol, benzyl alcohol, cyclohexanol, butanol, phenol, and the like. Preferred among these alcohols is a phenol.

A ketone is a substance that has a carbon atom attached by a double bond to oxygen

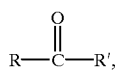

where R and R' represent alkyl, cycloalkyl, aryl, alkaryl, and arylalkyl containing 1 to about 30 carbon atoms; where R and R' may be the same or different. R and R' may also be joined together through a common carbon bond to form a cyclic ketone. Representative but not exhaustive of ketones that may be used in the HF or $BF_3$ complexes in this invention are acetone, diethyl ketone, methylethyl ketone, 2,4-pentandione, butyl cycloheptanone, benzophenone, phenyltolyl ketone, quinone, and the like.

A nitrile is a substance that has a carbon atom attached to a nitrogen by a triple bond, R—C≡N, where R represents alkyl, cycloalkyl, aryl, alkaryl, and arylalkyl containing 1 to about 30 carbon atoms. Representative but not exhaustive of nitrites that may be used in the HF or $BF_3$ complexes in this invention are acetonitrile, acrylonitrile, benzonitrile, tolylnitrile, phenylacetonitrile, and the like.

A carboxylic acid is a substance that has a carbon atom attached to a oxygen by a double bond and a hydroxyl group by a single bond

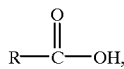

where R represents alkyl, cycloalkyl, aryl, alkaryl, and arylalkyl containing 1 to about 30 carbon atoms. Representative but not exhaustive of carboxylic acids that may be used in the HF or $BF_3$ complexes in this invention are formic acid, acetic acid, oxalic acid, malonic acid, crotonic acid, benzoic acid, phthalic acid, and like.

An ester is a substance that has a combination of carboxylic acid and alcohol

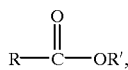

where R and R' represent alkyl, cycloalkyl, aryl, alkaryl, and aryl arylalkyl containing 1 to about 30 carbon atoms; where R and R' may be the same or different. R and R' may also be joined together through a common carbon bond to form a lactone. Representative but not exhaustive of esters that may be used in the HF or $BF_3$ complexes in this invention are ethyl acetate, ethyl benzoate, phenyl acetate, and like.

An amine is an organic derivative of ammonia with one, two or three hydrogen atoms being replaced by one, two or three organic residues

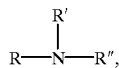

where R, R' and R" represent alkyl, cycloalkyl, aryl, alkaryl, arylalkyl containing 1 to about 30 carbon atoms; where R, R' and R" may be the same or different. R, R' and R" may also be joined together through a common carbon bond to form a cyclic amine. Representative but not exhaustive of amines that may be used in the HF or $BF_3$ complexes in this invention are ethylamine, diethylamine, triethylamine, aniline, benzylamine, diphenylamine, diethylphenylamine and like.

A sulfide is a substance that has two organic residues bonded to the same sulfur atom, R—S—R', where R and R' represent alkyl, cycloalkyl, aryl, alkaryl, and arylalkyl containing 1 to about 30 carbon atoms; where R and R' may be the same or different. R and R' may also be joined together through a common carbon bond to form a cyclic sulfide with the sulfur being a part of the cyclic structure such as tetrahydrothiophene and thiophene. Representative but not exhaustive of sulfides that may be used in the HF or $BF_3$ complexes in this invention are dimethyl sulfide, diethyl sulfide, dibutyl sulfide, diamyl sulfide, diisopropyl sulfide, diphenyl sulfide, dibenzyl sulfide, ethyl methyl sulfide, tetrahydrothiophene, and thiophene.

Pre-activation of the Nickel Catalyst

In solution reactions, the catalyst components (organonickel compound, organoalumium co-catalyst, promoter) can be added in any order directly to the solution, emulsion, or suspension polymerization, although some sequences may be preferred. No pre-activation is required.

However, in commercial-like gas phase reactions no combination or order of addition of the components of nickel catalyst leads to a polymerization catalyst with acceptable activity levels for polymerization of these dienes or vinyl compounds to produce commercial levels of product. We have found that some type of catalyst pre-activation must be performed to obtain adequate catalyst activity in gas phase butadiene and isoprene polymerization reactions using nickel catalysts.

Catalysts for diene polymerization reactions of the present invention employ a pre-activated catalyst system comprising a reaction mixture of (i) an organonickel compound; (ii) an organoaluminum; and (iii) at least one $BF_3$ or HF complex, wherein components (i), (ii) and (iii) are mixed together while in the presence of a small amount of at least one conjugated diolefin (iv). Optionally, water (v) is included. When water (v) is employed it is preferably added as the last ingredient to the combination of components (i)–(iiii) or components (i)–(iv). The amount of water used is calculated base upon the amount of aluminum employed. The molar ratio of water to aluminum varies from about 0.1: to about 1:1, preferably from abut 0.1:1 to about 0.5:1.

Components (i), (ii), and (iii) can be mixed together in any order while in the presence of a small amount of a conjugated diolefin (iv). The diolefin (iv) can be the same or different from the diene(s) or vinyl compound to be polymerized. Preferably, the diolefin (iv) is the same as at least one of the dienes to be polymerized. That is, the diolefin (iv) is selected preferably from the group consisting of butadiene, isoprene, and styrene. Most preferably the diolefin is butadiene (usually 1,3-butadiene) or isoprene, and not a mixture of the two. Other diolefins which can be used include polybutadiene, polyisoprene, 1,3-cyclooooctadiene, polystyrene, and styrene-butadiene copolymer (SBR).

While the order of addition of the components may be varied, it is advantageous to have the diolefin present when the nickel component contacts the alkyl aluminum component. Therefore, in the present invention, the diolefin (e.g., 1,3-butadiene) is either dissolved in at least one inert hydrocarbon or aromatic solvent or used in bulk as a solvent itself Suitable solvents are well known and can include, for example, hexane, isopentane, heptane, and toluene. Generally, when the diolefin is used as the solvent an additional solvent is not required.

After the diolefin is dissolved, the most preferred order of addition is organoaluminum and organonickel components followed by the addition of the promoter ($BF_3$ and/or HF complex). Water is added last. If desired, the organoaluminum and organonickel compounds may be mixed together before they are added to the dissolved diolefin. Ambient temperature and pressure can be employed, since there is no advantage gained by using higher temperatures and pressures.

The amount of diolefin used, expressed as a mole ratio of conjugated diolefin to nickel, for pre-activating can be within the range of about 1:1 to about 1,000:1. Preferred mole ratio of conjugated diolefin to nickel is about 5:1 to about 300:1. It is most preferred to use about 10:1 to about 150:1.

The pre-activated, four- or five- component nickel catalyst has activity over a wide range of catalyst concentrations and catalyst ratios. The four or five components inter-react to form an active catalyst.

After a sufficient contact time the active catalyst mixture (to be called prepoly solution) is ready to be fed to a polymerization reactor. For maximum catalyst activity the total mixture should be aged for at least one hour prior to use in the polymerization reactor. The prepoly solution has a shelf life of about a month. The prepoly solution of active catalyst mixture can be fed to the reactor as a solution, isolated as a solid, or can be first placed on a suitable support and fed as a solid to the reactor. When fed to a gas phase reactor as a solution, the prepoly nickel solution is introduced to the reactor in accordance with procedures set forth in U.S. Pat. Nos. 5,317,036 to Brady et al., U.S. Pat. No. 5,616,661 to Eisinger et al., and/or U.S. Ser. No. 08/659,764. When the active catalyst or active prepoly nickel solution is fed to the reactor, it has been found that passivation of the reactor with co-catalyst (organoaluminum compound(s)) is not required and that there is no need for a separate co-catalyst (organoaluminum compound) feed to the reactor during polymerization. That is, additional feed of the co-catalyst component or organoaluminum did not result in any additional appreciable catalyst activity.

All references cited herein are incorporated by reference.

The invention is illustrated by the examples which follow. All parts and percentages are by weight unless otherwise specified.

EXAMPLES

Nickel Catalyst Preparation Procedure

The following catalyst preparation procedure is typical of that used in the examples below. The catalysts and co-catalyst were used as purchased. The fluoride source was always in complex form. HF dibutyletherate, $BF_3$ diethyletherate, and $BF_3$-phenol complex were specifically used.

To a nitrogen dried 30 mL flask equipped with a stir bar is added 11.2 mL of dry degassed hexane and 3.6 mL of 0.87 M tri-isobutyl aluminum in hexane (3.1 mmole). The mixture is chilled to 0° C. and then 1.0 gram of butadiene is added. To the chilled solution is added 6 mL of 0.026 M nickel octoate (0.15 mmole) pre-dissolved in toluene. After stirring this mixture for 20 minutes, 4.2 mL of 1.5 M HF dibutyletherate (6.3 mmole) is slowly added. The catalyst solution is directly added to polymerization reactor.

1.3-Butadiene Polymerization Procedure

The polymerization of 1,3-butadiene is carried out in gas phase according to the following procedure: A one liter stirred autoclave is charged with 32 gram of dry carbon black N-650 used as flow aid. The reactor is dried with a flow purge of $N_2$ at 90–100° C. The internal reactor temperature is adjusted to the preferred reaction temperature. The reactor is pressure purged with butadiene and the reactor is then pressurized with 22 psig of monomer. The catalyst solution is injected into the reactor to initiate polymerization. A typical catalyst charge is between 0.025 and 0.1 mmole of nickel. The monomer is continuously fed to maintain the initial reactor pressure during the reaction time.

The reaction is terminated by injection of a stabilizer package dissolved in alcohol. Conditions and results are set forth in Table 1. The weight of the polymer and flow aid is obtained and the polymer yield determined by subtracting the amount of residual flow aid present as measured by ash content. The polymer microstructure is measure via infrared analysis and polymer molecular weight is measured via either reduced viscosity or GPC analysis.

Reduced viscosity, or reduced specific viscosity, or viscosity number, is a measure of the ability of a polymer to increase the viscosity of a solvent. It is the ratio of the specific viscosity of a solution to the concentration of (c) of the solute. In a diluted polymer solution, c is usually expressed as grams of polymer per deciliter (dl) of solution. The specific viscosity is obtained by comparing the retention time (t) taken for a solution of known concentration to flow between two marks on a capillary tube with the retention time taken by the solvent ($t_0$). The definition is the following:

$$\pi_{sp} = (t - t_0)/t_0$$

$$\pi_{red} = \pi_{sp}/c$$

Reduced viscosity is expressed in the unit of dl/g.

In this application, RV is determined by the following procedure: 0.15 g of stabilized flow-aid (carbon black or silica) containing polymer (e.g., polybutadiene) and 50 mL of toluene were added in a 100-mL screw cap bottle. The mixture was shaken overnight at room temperature, separated by first centrifugation, filtered through glass wool, and finally filtered through a Millipore® filter. The solution thus obtained was added in a Cannon-Fenske® Viscometer and retention time was measured at 30° C. RV is calculated using equation:

$$RV = [(t - t_0)/t_0]/c$$

The concentration c was determined by evaporating solvent from an aliquot of 25 mL of the solution and weighing the polymer residue in an aluminum dish.

Examples 1–3

A comparison of varying the order of addition of the catalyst components during the preparation step is shown in these examples. Example 1 employs the preparation step as represented in the typical procedure reported above to be known as "A". Here the nickel precursor is contacted with the aluminum alkyl in the presence of butadiene. Examples 2 and 3 use the following preparation methods: "B" nickel precursor is contacted with HF in the presence of butadiene followed by addition of the aluminum alkyl; "C" the aluminum alkyl is contacted with HF in the presence of butadiene followed by addition of the nickel precursor. All of the procedures generate active catalysts, although preparations following the order of addition as in "A" yield the most productive catalysts. The polymers made with these catalysts in butadiene polymerizations in gas phase reactions have excellent properties. The polymers have high cis content and molecular weights (based on reduced viscosity values) are in the desirable range.

Examples 4–7

These examples illustrate the effect of varying the HF/aluminum ratio on catalyst performance. Good catalyst productivity is achieved over a wide range of ratios. The polymers produced with these catalysts have desirable properties.

Examples 8–9

These examples show that highly active catalysts can be made with low levels of butadiene present in the catalyst solution.

Examples 10–14

These examples employ $BF_3$ etherate as the fluoride source. Good catalyst productivity is achieved over a wide range of $BF_3$/Al ratios. The polymers produced with these catalysts have desirable properties. In Examples 9 and 13 the nickel precursor was used without pre-dissolution in toluene. This shows the catalyst solutions and polymerization reaction can be conducted entirely free from aromatics.

Examples 15–21

The catalysts employed in these examples are the same as those used in Examples 10–14 except that water has been added to the mixture after the catalyst solution has been formed. The addition of water increases the catalyst activity and polymer molecular weight based on polymer reduced viscosity values.

Examples 22–23

The catalysts employed in these examples are the same as those used in Examples 10–21, except that $BF_3$-phenol complex was used.

Examples 24–26

These examples show that alternate diolefin sources are effective in formation of the active catalyst. Isoprene, 1,3 cyclo-octadiene and very low molecular weight polybutadiene (the number average molecular weight, $M_n$,=1800) can be used to make highly active catalysts.

Example 27

The catalyst used in this example has been supported on silica. The 7.5 ml of catalyst solution as prepared in Example 5 is added to 5.0 grams of Davidson 955 silica (which has been thermally activated at 600° C. under nitrogen) yielding a dry free flowing powder. The loading of nickel on the support is 0.011 mmoles/g after deposition. The supported catalyst was added directly to the polymerization reactor. Good catalyst productivity is achieved and the polymers produced with these catalysts have desirable properties.

Example 28

This example is the same as Example 5, except that isoprene is used as the monomer in place of butadiene in the polymerization reaction and the polymerization reaction is conduced at 65° C. The polymer is isolated and characterized by the usual methods.

Example 29

This example is the same as Example 5, except that styrene is added as a second monomer in the polymerization reaction and the polymerization reaction is conducted at 65° C. Styrene is added continuously based on the butadiene consumption rate. The styrene-butadiene polymer is isolated and characterized by the usual methods.

In the following examples, similar catalyst preparation procedure as above was used except that butadiene was not present in the catalyst solution. Same polymerization procedure was used.

Example 30 (Comparative)

In this example, catalyst was prepared by mixing nickel octoate, TEAL, and $BF_3 \cdot OEt_2$ in hexane at ratios of $Ni/Al/BF_3=1/40/40$. A portion of the solution containing 0.1 mmol of Ni was injected in the polymerization reactor. After one hour, 15 g of polybutadiene was obtained (a productivity of 150 g polybutadiene/mmol-hour). The product has a RV of 3.4, and cis content of 96.8%.

Example 31 (Comparative)

In this example, same procedure was used as in Example 30 except that $BF_3$-phenol complex was employed at ratios of $Ni/Al/BF_3=1/10/10$. With 0.055 mmol of nickel, 13.8 g of PBD was obtained, a productivity of 252 g polybutadiene/mmol-hour. Similar polymer properties were obtained: RV=3.9; cis content=97.6%.

parts oil. For convenience, we will hereafter refer to this compound as the "100/60 formulation." We have found that the Mooney viscosity of conventional solution-polymerized cis-polybutadiene in the 100/60 formulation is approximately the same as the Mooney viscosity of the neat polymer. Therefore, we can measure Mooney viscosity of a gas phase polybutadiene in the 100/60 formulation, and then infer that the neat polymer would have about the same value. In this discussion, "Mooney viscosity" means the quantity ML 1+4 @ 100° C., measured according to ASTM Standard Method D1646.

With current Mooney test instruments, it is also possible to monitor the relaxation of the torque upon stopping the rotor at the endpoint of the Mooney viscosity measurement. Let us define a "relaxation parameter" (RP) as follows:

$$RP = M60/ML$$

TABLE 1

| | Catalyst Preparation | | | | | Butadiene Polymerization[e] | | | | |
|---|---|---|---|---|---|---|---|---|---|---|
| Example No. | Ni[a] [M] | Al/Ni | "F"/Al | BD/Ni[b] | H2O/Al | Prep. Method | Productivity g/mmol-hr | RV | % Cis | Mn (×1000) | DI |
| | | TIBA | HF | | | | | | | | |
| 1 | 0.008 | 20 | 2.50 | 130 | — | A | 2278 | 4.7 | 98.1 | 235 | 3.4 |
| 2 | 0.008 | 20 | 2.50 | 118 | — | B | 108 | 1.6 | 96.2 | 55 | 6.7 |
| 3 | 0.008 | 20 | 2.50 | 118 | — | C | 757 | 3.5 | 97.9 | 172 | 3.9 |
| 4 | 0.006 | 20 | 2.00 | 148 | — | A | 1359 | 5.3 | 98.1 | 249 | 3.3 |
| 5 | 0.006 | 20 | 2.25 | 143 | — | A | 1536 | 4.7 | 97.8 | 220 | 3.6 |
| 6 | 0.007 | 20 | 2.50 | 111 | — | A | 1509 | 4.3 | 97.7 | 190 | 4 |
| 7 | 0.006 | 20 | 3.00 | 139 | — | A | 449 | 3.3 | 97.5 | 136 | 4.1 |
| 8 | 0.008 | 20 | 2.50 | 32 | — | A | 1472 | 5.3 | 97.4 | 204 | 3.4 |
| 9 | 0.010 | 20 | 2.50 | 49 | — | A[c] | 754 | 3.8 | 97.6 | 157 | 4.3 |
| | | TEAL | BF3 | | | | | | | | |
| 10 | 0.006 | 40 | 1.00 | 222 | — | A | 500 | 2.9 | 96.9 | 113 | 5.6 |
| 11 | 0.006 | 30 | 1.50 | 185 | — | A | 710 | 2.2 | 97.1 | 92 | 5.2 |
| 12 | 0.005 | 30 | 2.00 | 267 | — | A | 913 | 2.1 | 98.7 | 100 | 4.5 |
| 13 | 0.027 | 20 | 1.50 | 60 | — | A[c] | 1000 | 2.5 | 97.7 | 163 | 3.6 |
| 14 | 0.008 | 20 | 1.00 | 137 | — | A | 593 | 2.9 | 97.9 | | |
| 15 | 0.008 | 20 | 1.00 | 137 | 0.2 | A | 886 | 3.7 | 98.1 | 292 | 3.3 |
| 16 | 0.008 | 20 | 1.00 | 132 | — | A | 889 | 3.7 | 97.8 | 151 | 5 |
| 17 | 0.008 | 20 | 1.00 | 132 | 0.3 | A | 1152 | 4.4 | 97.2 | 164 | 4.2 |
| 18 | 0.010 | 10 | 1.00 | 86 | 0.1 | A | 922 | 4.9 | 97.8 | 269 | 3.6 |
| 19 | 0.010 | 10 | 1.00 | 86 | 0.2 | A | 1075 | 4.7 | 98.5 | 235 | 3.7 |
| 20 | 0.010 | 10 | 1.00 | 86 | 0.3 | A | 1045 | 5.9 | 98.6 | 268 | 3.3 |
| 21 | 0.010 | 10 | 1.00 | 86 | 0.5 | A | 951 | 4.5 | 97.5 | 270 | 4.1 |
| 22 | 0.010 | 20 | 1.00 | 120 | — | A | 1732 | 3.9 | 97.4 | 128 | 4.2 |
| 23 | 0.010 | 20 | 0.60 | 120 | — | A | 825 | 4.7 | 97.5 | 198 | 3.8 |
| | | TIBA | HF | | | | | | | | |
| 24 | 0.006 | 15 | 1.00 | 253 | — | A | 718 | 2.5 | 97.7 | 98 | 5.7 |
| 25 | 0.008 | 20 | 2.50 | 26 | — | A | 445 | 3.2 | 97.5 | 160 | 4.1 |
| 26 | 0.008 | 20 | 2.50 | 2 | — | A | 983 | 4.4 | 98 | 216 | 3.8 |
| 27 | 0.011[d] | 20 | 2.50 | 134 | — | A[d] | 1452 | 4.3 | 97.7 | 173 | 4.3 |

[a]= Examples 1–15 and 22–25 used Ni Octoate; Examples 16–21 used Ni Naphthenate.
[b]= Example 22, 23 and 24 used Isoprene, 1,3 COD and VLMW BR, respectively, instead of BD.
[c]= Example 9 and 13, the Ni was not predissolved in toluene.
[d]= Unit is mmolNi/g catalyst. Prepolymer Method A mixed with silica.
[e]= 0.025–0.10 mmol catalyst; 50° C.; 32 g CB N650; 20–25 psi BD; 60 minutes.
"F" = fluoride source
RV = reduced viscosity
DI = dispersity index (Mw/Mn)

The gas phase polybutadienes can be further characterized by the Mooney viscosity and Mooney relaxation behavior of a polymer/carbon black/oil compound having a fixed composition. For example, gas phase polybutadiene produced with N650 carbon black as a fluidization aid, can be compounded with additional N650 black plus an ASTM Type 103 naphthenic oil, to give an overall composition of 100 parts polybutadiene polymer, 100 parts N650 black, and 60 where M60 is the residual torque 60 seconds after stopping the rotor, and ML is the Mooney viscosity (i.e., the torque immediately prior to stopping the rotor). Thus, RP is the fraction of the Mooney viscosity that persists in the torque signal 60 seconds after stopping the rotor.

We have found that, the gas phase polybutadienes (in the 100/60 formulation) produced in this invention have RP/ML values typically within the range of 0.0017 to 0.0023.

What is claimed is:

1. A process for the polymerization of a diene and/or a vinyl-substituted compound selected from the group of monomers consisting of butadiene, isoprene, styrene, and mixtures thereof comprising: polymerizing at least one of the monomers in a gas phase reactor with a pre-activated catalyst system, under polymerization conditions, wherein the pre-activated catalyst system comprises a reaction mixture of (i) an organonickel compound;

(ii) an organoaluminum compound; and (iii) at least one complex formed with HF or $BF_3$ and one or more molecules from the class of organic compounds selected from the group consisting of an ether, an alcohol, a ketone, a nitrile, a carboxylic acid, an ester, an amine, a sulfide, and mixtures thereof;

wherein components (i), (ii) and (iii) are mixed together in the presence of at least one component (iv) selected from the group consisting of butadiene, isoprene, styrene, polyisoprene, 1,3-cycloctadiene, polystyrene, and a styrene-butadiene copolymer wherein the mole ratio of component (iv) to nickel ranges from about 1:1 to about 1000:1, and wherein water comprises an additional component (v) of the pre-activated catalyst system, which component (v) is added last to the catalyst system or is added to the polymerization.

2. The process of claim 1 wherein the polymerization is conducted in the presence of an inert particulate material selected from the group consisting of carbon black, silica, talc, clay, and mixtures thereof.

3. The process of claim 1 wherein the polymerization is conducted at temperatures ranging from about 20° C. to 120° C.

4. The process of claim 1 wherein the component (iv) is the same or different from the monomer being polymerized.

5. The process of claim 1 wherein component (iv) is the same as at least one of the monomers being polymerized.

6. The process of claim 1 wherein the organonickel compounds is selected from the group consisting of nickel benzoate, nickel acetate, nickel naphthenate, nickel octoate, nickel neodecanoate, nickel 2-ethylhexanoate, bis(π-allyl nickel), bis(π-cycloocta-1,5-diene), bis(π-allyl nickel trifluoroacetate), bis(α-furyl dioxime) nickel, nickel palmitate, nickel stearate, nickel acetylacetonate, nickel salicaldehyde, bis(salicyladehyde) ethylene diimine nickel, bis(cyclopentadiene) nickel, cyclopentadienylnickel, nitrosyl and nickel tetracarbonyl;

wherein the organoaluminum compound has a formula selected from the group consisting of (a)

wherein $R^1$ is selected from the group consisting of alkyl, cycloalkyl, aryl, alkaryl, arylalkyl, alkoxy, hydrogen and fluorine; $R^2$ and $R^3$ are the same or different and are selected from the group consisting of alkyl, cycloalkyl, aryl, alkaryl, and arylalkyl; and (b) oligomeric linear alkyl aluminoxanes represented by the formula:

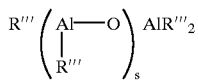

and oligomeric cyclic alkyl aluminoxanes of the formula:

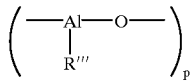

wherein s is 1 to 40, p is 3 to 40, and R''' is an alkyl group containing 1 to 12 carbon atoms.

7. The process of claim 1 wherein (i) the organonickel compound is selected from the group consisting of nickel salts of carboxylic acids, organic complex compounds of nickel, and mixtures thereof; (ii) the organoaluminum compound is a trialkylaluminum; (iii) the promoter is a HF complex; and (iv) is butadiene; and the molar ratio of Al/Ni is between 5 and 30; HF/Al between 1.5 and 3.5.

8. The process of claim 1 wherein (i) the organonickel compound is selected from the group consisting of nickel salts of carboxylic acids, organic complex compounds of nickel, and mixtures thereof; (ii) the organoaluminum compound is a trialkylaluminum; (iii) the promoter is a $BF_3$ complex; and (iv) is butadiene; and the molar ratio of Al/Ni is between 5 and 30; $BF_3$/Al between 0.5 and 2.5.

9. The process of claim 8, wherein the promoter is a complex of BF3 and an organic compound selected from the group consisting of an ether or an alcohol.

10. The process of claim 9, wherein the alcohol is a phenol.

11. The process of claim 1 wherein (i) the organonickel compound is selected from the group consisting of nickel salts of carboxylic acids, organic complex compounds of nickel, nickel tetracarbonyl, and mixtures thereof; and (ii) the organoaluminum compound is selected from the group consisting of an alkylaluminum, an alkylaluminum halide, an alkylaluminum hydride, and an alumoxane.

12. The process of claim 1 wherein (i) the organonickel compound is selected from the group consisting of nickel salts of carboxylic acids, organic complex compounds of nickel, and mixtures thereof; (ii) the organoaluminum compound is a trialkylaluminum; (iii) the promoter is a $BF_3$ complex; and the molar ratios are an Al/Ni between 5 and 30, a $BF_3$/Al between 0.5 and 2.5, and water/Al between 0 to 1.

13. A granular, particulate resin particle produced in accordance with the process of claim 1.

14. A resin particle produced in accordance with the process of claim 1 which is granular and free-flowing comprising an outer shell having a mixture of an inert particulate material and a polymer, said inert particulate material being present in said outer shell in an amount higher than 75% by weight based on the weight of said outer shell, and an inner core having a mixture of polymer and inert particulate material, said polymer being present in the inner core in an amount higher than 90% by weight based on the weight of said inner core, wherein said polymer is a homopolymer or copolymer of a monomer selected from the group consisting of butadiene, isoprene, styrene, and a mixture thereof, and which resin particle has a residue of nickel in an amount ranging from about 1 ppm to 240 ppm and a residue of fluorine ranging in amount from 0.6 ppm to 47,000 ppm based upon the total weight of the polymer.

15. The resin particle of claim 14 wherein the resin additionally has a boron residue ranging from about 0.2 ppm to about 9,000 ppm based upon the total weight of the polymer.

16. The resin particle of claim 15 wherein the resin particle has a reduced viscosity ranging from 2 to 6 dl/g.

17. The resin particle of claim 14 wherein the polymer is selected from the group consisting of polybutadiene, polyisoprene, polystyrene, butadiene-isoprene copolymers, butadiene-styrene copolymers, and isoprene-styrene copolymers and wherein the inert particulate material is selected from carbon black, silica, and mixtures thereof.

* * * * *